(12) United States Patent
Adelsbach et al.

(10) Patent No.: US 6,856,977 B1
(45) Date of Patent: Feb. 15, 2005

(54) METHOD AND SYSTEM FOR PROVING OWNERSHIP OF DIGITAL DATA

(75) Inventors: André Adelsbach, Trier (DE); Birgit Pfitzmann, Saarbruecken (DE); Ahmad-Reza Sadeghi, Saarbruecken (DE)

(73) Assignee: International Business Machines Corporation, Armonk, NY (US)

(*) Notice: Subject to any disclaimer, the term of this patent is extended or adjusted under 35 U.S.C. 154(b) by 508 days.

(21) Appl. No.: 09/666,256

(22) Filed: Sep. 21, 2000

(51) Int. Cl.[7] .............................................. G06F 17/60
(52) U.S. Cl. ........................ 705/57; 713/200; 713/176; 380/200
(58) Field of Search ............................. 705/57, 50, 51, 705/58, 156; 713/200–202, 168, 176, 229; 380/200, 201, 203, 204, 277, 278, 284

(56) References Cited

U.S. PATENT DOCUMENTS 5,892,906 A * 4/1999 Chou et al. ................. 713/201
6,195,432 B1 * 2/2001 Takahashi et al. ............. 380/9
6,272,632 B1 * 8/2001 Carman et al. ............. 713/168

FOREIGN PATENT DOCUMENTS

JP          408272476 A  * 10/1996

OTHER PUBLICATIONS

Guatemala: Construction Machinery Market Jun. 1999, 1 page.*

* cited by examiner

Primary Examiner—Pierre E. Elisca
(74) Attorney, Agent, or Firm—Louis P. Herzberg; Thomas A. Beck (57) ABSTRACT

A system for proving ownership of digital media works. Proof of ownership of such type of work is provided by a protocol for registering a work with a registration center thus providing the rightful owner or copyright holder of the work with an ownership certificate. There is also provided a protocol for proving to another party who is a prospective buyer or licensee, that an ownership claim is correct and valid by providing the ownership certificate when required. Another protocol is utilized for showing to a third party, a prospective buyer or licensee, that a second party has correctly obtained the corresponding work from the rightful copyright owner.

17 Claims, 8 Drawing Sheets

METHOD AND SYSTEM FOR PROVING OWNERSHIP OF DIGITAL DATA

DESCRIPTION

1. Field of the Invention

Protection of "digital property" has become crucial in the widespread and rapidly growing use of digital media. Making the misuse of copyrighted works detectable, and thus deterring people from misuse, is the most promising measure currently known. To achieve this, most proposals apply watermarking techniques and focus on resolving the ownership in disputes which may arise after a misuse has been detected. Here a trusted third party (e.g. a judge) decides on the ownership by comparing ownership claims of disputing parties. However, resolving disputes does not necessarily imply determining the rightful owner, since he/she might not even be participating in the dispute. Moreover, in contrast to disputes, one is in practice often confronted with only a single claim of ownership, e.g., in electronic market places where buyers intend to purchase digital items from someone claiming to be the rightful copyright holder. Proof of ownership is highly desirable in such situations because, on the one hand, the buyers are ensured not to buy digital items from fake copyright holders and, on the other hand, the copyright holders are protected against unauthorized resale of their digital works.

The present invention provides a solution for this problem by providing a novel general model and a set of generic protocols for proving ownership of digital works. Also introduced are concrete embodiments of these generic protocols, e.g., by applying particular watermarking schemes.

2. Introduction and Prior Art

It is a very difficult, if not impossible, task in open environments to prevent digital content from being copied, redistributed and misused. Legal rights, especially copyrights, are permanently endangered and can hardly be protected. The most promising protection measure is to deter people from misusing or illegally redistributing copyrighted content.

One way to possibly deter the misuse is to make it detectable. If a person is accused of misuse and claims to be the rightful copyright holder, then an ownership dispute arises. Motivated by such scenario, previous proposals focus on resolving disputes in favor of the rightful copyright holder. In other words, these proposals aim at providing the copyright holders with means which enable them to show the precedence of their ownership claims over all other ownership claims.

Today, watermarks as proposed, e.g., by

Ingemar J. Cox, Joe Kilian, Tom Leighton, Talal Shamoon: "A Secure, Robust Watermark for Multimedia", published in Lecture Notes in Computer Science 1174, Springer-Verlag, Berlin, 1996, pp. 185–206, or M. Kutter: "Watermarking resisting to translation, rotation and scaling", published in the Proceedings of SPIE, Multimedia systems and applications, Boston, USA, 1998, pp. 423–431, or Alexander Herrigel, Joseph ÓRuanaidh, Holger Petersen, Shelby Pereira, Thierry Pun: "Secure Copyright Protection Techniques for Digital Images", published in Lecture Notes in Computer Science 1525, Springer-Verlag, Berlin, 1998, pp. 169–190, or surveyed, e.g., by Mitchell D. Swanson, Mei Kobayashi, Ahmed H. Tewfik: "Multimedia Data-embedding and Watermarking Technologies", published in the Proceedings of the IEEE, Vol. 86, No. 6, June 1998, pp. 1064–1087, or Frank Hartung, Martin Kutter: "Multimedia Watermarking Techniques", published in the Proceedings of the IEEE, Vol. 87, No. 7, July 1999, pp. 1079–1107, are promising means for solving such ownership disputes. Solving ownership disputes by means of watermarks is described, e.g., by Scott Craver, Nasir Memon, Boon-Lock Yeo, Minerva M. Yeung: "Resolving Rightful Ownerships with Invisible Watermarking Techniques: Limitations, Attacks, and Implications", published in the IEEE Journal on Selected Areas in Communications, Vol. 16, No. 4, May 1998, pp. 573–586, or W. Zeng, B. Liu: "On resolving rightful ownerships of digital images by invisible watermarks", published in the Proceedings of the International Conference on Image Processing, Vol. 1, St. Barbara, Calif., USA, October 1997, pp. 552–555, or Lintian Qiao, Klara Nahrstedt: Watermarking Methods for MPEG Encoded Video: "Towards Resolving Rightful Ownership", published in the Proceedings of the International Conference on Multimedia Computing and Systems, Austin, Tex., USA, 1998, pp. 276-285, or Mitchell D. Swanson, Mei Kobayashi, Ahmed H. Tewfik: "Multimedia Data-embedding and Watermarking Technologies", published in the Proceedings of the IEEE, Vol. 86, No. 6, June 1998, pp. 1064-1087, or Frank Hartung, Martin Kutter: "Multimedia Watermarking Techniques", published in the Proceedings of the IEEE, Vol. 87, No. 7, July 1999, pp. 1079–1107.

A somewhat different solution for resolving ownership disputes, assisted with registration, was published by Alexander Herrigel, Joseph ÓRuanaidh, Holger Petersen, Shelby Pereira, Thierry Pun in "Secure Copyright Protection Techniques for Digital Images", Lecture Notes in Computer Science 1525, Springer-Verlag, Berlin, 1998, pp. 169–190. This solution is also subject of European patent application EP 1013077 A1.

However, it is more desirable to have a real proof of ownership, i.e. to be able to directly verify the rightfulness of an ownership claim for a certain work. This shall be discussed briefly in the following.

The result of an ownership dispute is the decision usually made by an honest third party, e.g. a judge or a jury, after comparing several claims of ownership. This result does not determine the rightful ownership in general, since the rightful copyright holder might not even be participating in the dispute.

Furthermore, in contrast to disputes, one is often faced with only a single claim of ownership and has to decide on its rightfulness. An important example is purchasing digital items in electronic market places: Suppose a cheater obtains a digital work, claims to be the rightful copyright holder and starts selling or otherwise illegally redistributing copies. Without proof of ownership, honest buyers purchasing this work will get into trouble when the real owner later detects the misuse. In such a scenario, a proof of ownership is highly desirable. On the one hand it guarantees the buyers that they obtain the rights of usage from the real copyright holder. On the other hand it makes the professional unauthorized resale and redistribution of copyrighted works very difficult because honest buyers will usually request an ownership proof from the seller. Such ownership proofs should be transferable, i.e. the buyers should be able to show them to third parties to prove that they have rightfully purchased the work.

The Invention

The present invention provides a solution for this problem by presenting a general model for ownership proofs of digital works. In this model, the copyright holders are required to register their works at a registration center before distributing them. One might think that it is trivial to achieve proofs of ownership when involving a registration center. However, the crucial point to note is that ownership refers not only to the original work but also to all works derived from or similar to this original work, which have not been explicitly registered.

This has two implications: Firstly, a rightful copyright holder should be able to perform ownership proofs on similar works (e.g. images with reduced quality). Secondly, multiple registrations of similar works have to be avoided by the registration center; otherwise a cheater may imperceptibly modify a work and register it under his/her name and thus be able to perform fake ownership proofs. The ownership proof scheme according to this invention utilizes a similarity test function both in the ownership proofs and in the registration process to handle the implications mentioned.

In the following section, a model for copyright ownership according to the invention is introduced. The subsequent sections define and describe the components of ownership proof schemes, the requirements they should fulfill, a generic scheme for proof of ownership based on a generic similarity test as a primitive, some embodiments of the similarity test, e.g. by using watermarking schemes, leading to concrete ownership proof systems, and proposals of some measures based on authentication trees to make a cheating registration center accountable.

DETAILED DESCRIPTION OF THE INVENTION

The following description is supported by the appended drawings which show in

A. The Model of Copyright Ownership

To define the ownership formally, some notations are introduced first. The object to be protected is called a work W. The set of all possible works is denoted by $\mathcal{W}$ and the set of all possible copyright owners (holders) by $\mathcal{H}$.

The ownership is modeled formally as a relation between a copyright holder and a work. From a legal point of view one becomes the copyright holder of a new work upon its creation even without having the corresponding work registered. However, in practice original works should be registered before being published to obtain a piece of evidence. The crucial point is that the copyright holder also holds the copyright on all works that are derived from his/her original work.

Therefore the ownership relation $$H \sim_{orig} W \Leftrightarrow H \text{ has registered the new work } W, \quad (1)$$

which models only the original work W as H's property, is not sufficient in practice.

In the present context, a work W" is considered similar to W ($W \rightarrow_{sim} W"$), if it is e.g. a trivial transformation of W. Transformations achieved by existing standard software (for images, these are e.g. geometric transformations or color manipulations) fall into the class of trivial transformations.

Now assume that a similarity relation $\rightarrow_{sim}$ is given. The ownership relation in (1) is improved by considering H'copyrights on all works W" similar to his/her original work W:

$$H \sim_{holder}^{W} W" \Leftrightarrow H \sim_{orig} W \wedge W \rightarrow_{sim} W" \quad (2)$$

This definition of the ownership relation would be sufficient if the underlying similarity relation $\rightarrow_{sim}$ were an equivalence relation. This is because an equivalence relation partitions $\mathcal{W}$ into equivalence classes, i.e., rightful ownership reltions would not collide. However, considering $\rightarrow_{sim}$ as an equivalence relation does not always make sense, since it is not symmetric in general (e.g. a detailed and a rough map of the same geographic area).

Figure 1:
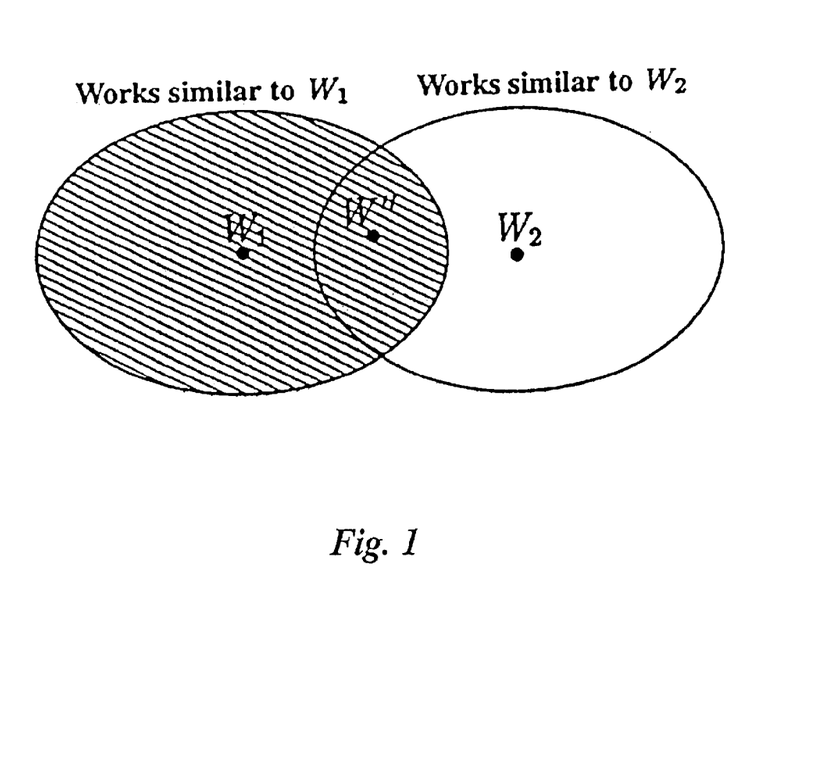
FIG. 1 the general situation where the similarity relation is not an equivalent relation.

If the underlying similarity relation is not an equivalence relation, the definition (2) may lead to ownership conflicts as shown in FIG. 1.

A copyright holder $H_1$ has registered the work $W_1$, i.e., $H_1 \sim_{orig} W_1$ holds. Later, a copyright holder $H_2$ registers a work $W_2$. This is possible because $W_2$ is not similar to $W_1$, i.e., $H_2 \sim_{orig} W_2$. If the similarity relation is not an equivalence relation, the set of works similar to $W_1$ may intersect with the set of works similar to $W_2$. The ownership relation in (2) considers both $H_1$ and $H_2$ to be the copyright holders of W". However, in practice only $H_1$ is the rightful copyright holder of W", because $W_1$ was registered before $W_2$. Thus, one has to further enhance the ownership relation in (2) by the registration time of the original work to comply with the practical needs. The ownership relation is redefined as follows.

Definition 1 (Ownership Relation):

$$H \sim_{holder}^{W} W" \Leftrightarrow (H \sim_{orig} W \wedge W \rightarrow_{sim} W") \wedge (\exists \hat{W}: \hat{W} \rightarrow_{sim} W" \wedge (\hat{W} \text{ was registered before } W)).$$

The set $\mathcal{W}_W = \{W" \in \mathcal{W} | H \sim_{holder}^{W} W"\}$ denotes the collection of all works which are considered the property of the owner H of W. This set will be referred to as a work class. The ownership proof scheme will allow H to prove his/her ownership of all works in the work class $\mathcal{W}_W$. In principle, this ownership relation depends on the current time. However, a time parameter can usually be omitted because once $H \sim_{holder}^{W} W"$ is established, it does not change.

So far, the existence of a similarity relation $\rightarrow_{sim}$ was assumed. For concrete implementations one has to define this relation and in particular find a method to test it. In real life, official experts decide (e.g. in disputes) whether a work represents someone's own creativity or is just a trivial derivation from an already protected work. Hence they test a so called perfect similarity relation. It would be much more efficient and less costly if one were able to test the perfect similarity relation between works in an automatic way. Unfortunately, no known tool can perform this in a reasonable amount of time. This invention will therefore work with other similarity relations which can be automatically tested; they are referred to as restricted similarity relations. One can also imagine hybrid similarity tests, i.e. an automatic test assisted by a human expert, if the decision certainty of the automatic test falls under a given threshold.

B. The Definition of Ownership Proof Schemes

The involved roles in a scheme for proof of ownership are the copyright claimants H, one registration center RC and third parties D, D'.

If there are several registration centers, they must act in a coordinated way so that ownership proofs are globally valid. Hence for this purpose they are equivalent to one.

Except as described later in Section E, RC is always assumed to be trusted by all other parties.

The model consists of four protocols: First, all necessary keys are generated and distributed authentically. Then the copyright holder H registers his/her original work W at RC. From now on H, and no other, can prove to any (correct) D his/her ownership of any work in $\mathcal{U}_W$. The correctness of D is needed here because a dishonest party can, e.g., always refuse to accept the proof. The last protocol enables D to show any other correct party D' that H has proven his/her ownership.

The protocols are summarized in the following definition.

Definition 2 (Ownership Proof Scheme):

A scheme for proof of ownership consists of the four protocols initialize, register, prove and show.

The initialization protocol initialize sets up the system and includes also the key generation for all involved parties. Every party X generates its own key pair $k_x=(sk_x, pk_x)$ and obtains the authentic public keys of the other involved parties. Depending on the used cryptographic schemes, keys may consist of several subkeys. Different basic cryptographic primitives may be used such as signatures, authentication codes, commitments or even more complicated ones like asymmetric fingerprinting.

The key distribution may be achieved by a public-key infrastructure and may also be executed successively, i.e., the keys may be generated and distributed on demand.

In the following, it is tacitly assumed that each honest party X inputs its own identity $Id_x$, its keys as well as the public keys and the identities of the other participants. Moreover, a text value reg_text could be input that could contain or point to additional registration-relevant information; this was omitted in the definition.

The registration protocol register is a two-party protocol between H and RC. Here H inputs his/her original work W, and RC inputs W and the content of a secret local memory $mem_{RC}$. The outputs to H are a proof string $proof_H$ and possibly an (imperceptibly) modified work $W'\epsilon\mathcal{U}_W$. RC may need to modify the original work to perform a similarity test on it, e.g. in an implementation with watermarks. In this case H should only make the version W'publicly available. The output to RC is typically a modified content of its secret local memory $mem'_{RC}$. Instead, both parties may obtain an output failed.

The protocol prove for proof of ownership involves up to three parties: at least H and D, and in some cases also RC. H inputs the work $W''\epsilon\mathcal{U}_W$ for which he/she wants to prove his/her ownership based on a registered work W, and $proof_H$ obtained in register. D inputs the work W''. If RC takes part, it inputs W''and the content of its secret local memory $mem_{RC}$. The output to D is a pair (result, $proof_D$), where the boolean value result indicates whether or not H is the rightful owner of W''. If RC participates, it obtains an output $mem'_{RC}$.

The show protocol involves up to three parties, but at least D and D'. D inputs a work $W''\epsilon\mathcal{U}$, the identity of the copyright holder $Id_H$ and $proof_D$ obtained in a run of prove for W''. D'also inputs the work W''and $Id_H$. If RC takes part, it inputs the content of its secret local memory $mem_{RC}$. The output is a boolean value result for D' and a value $mem'_{RC}$ for RC if it is involved in the protocol.

Now the requirements on ownership proof schemes are defined. The fact that RC is honest and its inputs and outputs contain the registered works and the identity of their rightful owners implies that the relation~$_{orig}$ from (1) is well-defined in any protocol run, and thus also the ownership relation.

Definition 3 (Ownership Proof Requirements):

Suppose that RC is honest and initialize has been executed. In the following, prot(in,•) means that the honest participants execute the protocol prot with input parameters in. The requirements are sorted by the party mainly interested in them.

For the registration center RC:
(RU) Uniqueness: No party H* can successfully register a work that RC already considers copyrighted, i.e., if register(Ŵ,•) ended successfully, no later execution register(W) with $\hat{W}\rightarrow_{sim} W$ succeeds. This could be weakened so that the owner of Ŵ is allowed to register works W to extend the coverage of his copyright in cases where$\rightarrow_{sim}$ is not an equivalence relation. The effectiveness and the scheme below could easily be adapted to this.

For the copyright holder H:
(HE) Effectiveness: H can successfully execute register (W,•) for a new work W unless $\hat{W}\rightarrow_{sim} W$ for an already registered work.

(HA) Authenticity: No party H*≠H can successfully execute register(W, $Id_H$,•) for any work W, nor prove (W'', $Id_H$,•) with a correct party D for any work W''.

(HAD') Authenticity w.r.t. D': No party can successfully execute show(W'', $Id_H$, $Id_D$,•) with a correct party D', unless H has successfully registered a work W with $W''\epsilon\mathcal{U}_W$ and executed prove(W'', $Id_D$,•).

After successfull registration of a work W by H, additional requirements for H and a honest D are:
(HP) Provability: H can successfully prove its ownership to D, i.e., for any $W''\epsilon\mathcal{U}_W$ prove(W'', $Id_D$,•) outputs (true,•) to D.

(HU) Uniqueness: No other party H* can successfully execute prove(W'', •) with D on a work $W''\epsilon\mathcal{U}_W$.

For the third party D:
(DC) Correctness: The protocol prove(W'', $Id_H$,•) outputs true to D only if H is indeed the copyright holder, i.e., $W''\epsilon\mathcal{U}_W$ for a work W such that RC performed register (W, $Id_H$,•) with an output other than failed.

(DS) Showability to a correct D': If D has executed prove(W'', $Id_H$,•) with the output (true, $proof_D$), then it can execute show (W'', $Id_H$, $proof_D$, •) with any correct D' with the output true.

For a second third party D':
(D'C) Correctness: The protocol show(W'',$Id_H$, •) outputs true to D' only if H is indeed the copyright holder, i.e., $W''\epsilon\mathcal{U}_W$ for a work W such that RC performed register (W, $Id_H$,•) with an output other than failed.

Some of these requirements could be omitted or softened for certain applications. In particular, authenticity is not always needed, and weaker versions of (DC) and (D'C) are possible where other parties are allowed to make or show ownership proofs, as long as the correct identity $Id_H$ of the owner is used. On the other hand, one could add authenticity for D with respect to D'.

C. Generic Ownership Proof Schemes

In the generic schemes it is assumed that an arbitrary similarity relation $\rightarrow_{sim}$ and a similarity test sim_test for it are given. Moreover, an algorithm sim_init may be given that performs setups for later similarity tests for a given work. These relations are distinguished with respect to two criteria:

1. Type of similarity relation:

If similarity is an equivalence relation, it results in partition of the set $\mathcal{W}$ of all works. Thus the problem of overlapping work sets mentioned in Section B. does not arise. This will simplify the scheme significantly.

2. Type of similarity test:

There are private and public similarity tests. Private tests require secret information only known to the registration center. Public tests only need noncritical information which can be made publicly available for testing the similarity to the work W. In all cases, this information must initially be generated for a work W with sim_init. The output of this algorithm is denoted by (W', simrec$_W$, testinf$_W$). Here W' is the possibly modified (watermarked) work, simrec$_W$ a private record and testinf$_W$ the non-critical information. A private test is denoted by sim_test(W", simrec$_W$) and a public test by sim_test(W", testinf$_W$). As testinf$_W$ can always be a part of simrec$_W$, one can generically use the private notation when RC is carrying out the test.

The details of the initialization protocol are omitted and it is assumed that it has been performed prior to the other protocols, in particular that all necessary keys have been distributed authentically. Moreover the details of the corresponding message formats are omitted, e.g. when a signature is sent it is assumed that all message parts that are not known a priori are also sent and that techniques of robust protocol design like protocol-type and message-type tags are applied.

Registration: In the register protocol, H sends his/her original work W to RC in a signed message. Then RC performs a local test, denoted by registered?, to check whether W is similar to an already registered work. This check is necessary to prevent multiple registrations of similar works. In principle, RC iterates over all registered original works $W_i$ performing the similarity test sim_test(W, simrec$_{W_i}$). If one of these similarity tests outputs true, then registered?(W) ends with true and the register protocol ends with failed.

Otherwise, RC executes sim_init for W, which produces a possibly modified version W' of the original work and also simrec$_W$ and testinf$_W$. RC stores all these values in a new registration record rec$_W$ for W in its secret local memory mem$_{RC}$. If it is possible for a similarity relation that W' is similar to an already registered work while W was not, the above iteration should be repeated for W' and, if necessary, another W' be generated.

It sends W' together with the generic ownership certificate proof$_H$=sign$_{RC}$(Id$_H$, h(W), h(W'), testinf$_W$, reg_time, reg_text), where h(W), h(W') denote hash values of a collision free hash function h and reg_time the registration time. In schemes where always W'=W, one can obviously omit W' and h(W'), similarly testinf$_w$ if it is always empty.

Figure 2A:
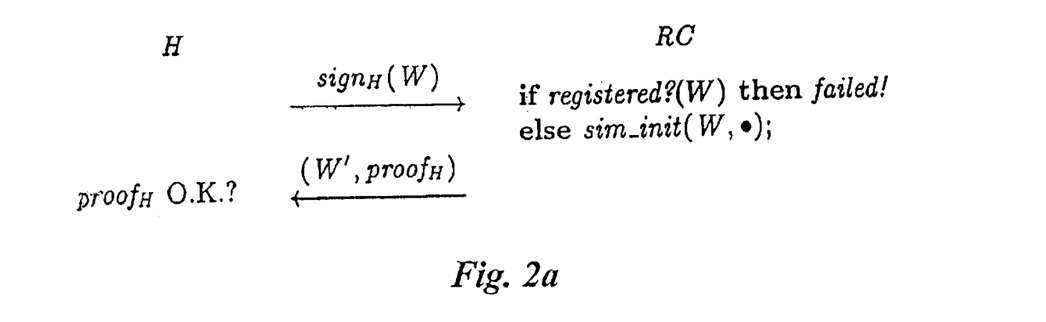
FIGS. 2a and 2b the registration protocol register(W)
Figure 2B:
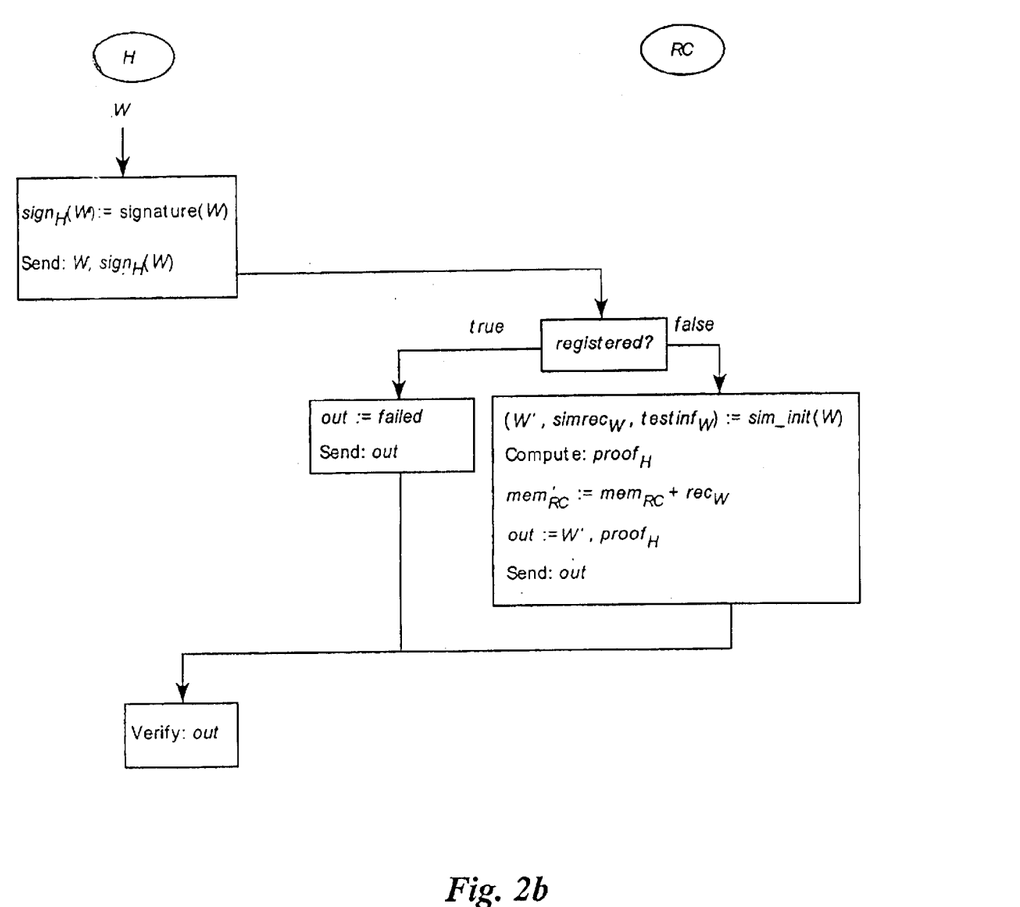

It was also shown where a textual description of the registration could be handled in the protocol. The generic registration protocol is shown in FIGS. 2a and 2b, the latter showing the protocol as a flow diagram.

Proof of ownership: If H wants to prove the ownership of a work W"$\in \mathcal{W}_W$ to a third party D, it starts the prove protocol by sending W" and init_proof$_D$=sign$_H$(Id$_H$, Id$_D$, h(W'), prove_time, proof$_H$) to D. By this signature, H nonrepudiably states that he/she initiated prove with D for the work W" at the time prove_time and used the ownership certificate proof$_H$. D verifies that init_proof$_D$ and proof$_H$ are correct. Then D looks whether the hash value of W" is explicitly contained in proof$_H$. If yes, D immediately outputs result=true and proof$_D$=init_proof$_D$. This should be the most common case because it occurs when H legally redistributes one of its own registered works. The following more complicated cases, where H proves ownership in a modified work W", are mainly needed for the hopefully rare case that an illegal redistribution has happened.

If h(W") is not contained in proof$_H$ then D has to execute a subprotocol test(init_proof$_D$, W") to verify that W"$\in \mathcal{W}_W$ holds for the work W indicated by h(W). If yes, this protocol outputs proof$_D$.

Figure 3A:
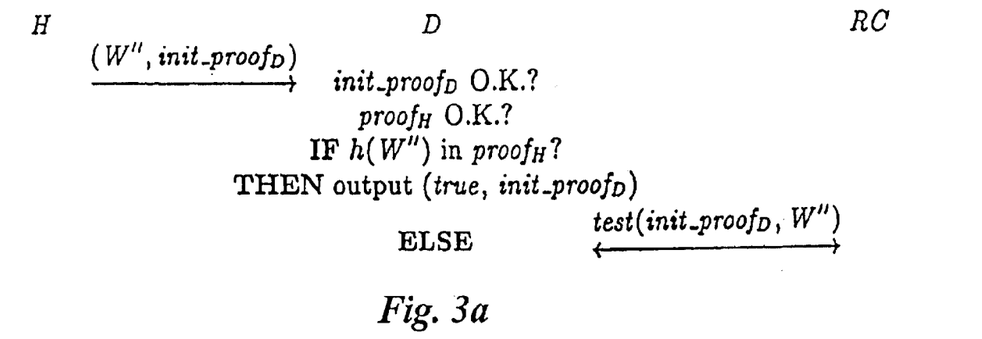
FIGS. 3a and 3b the proof of ownership protocol prove (W")
Figure 3B:
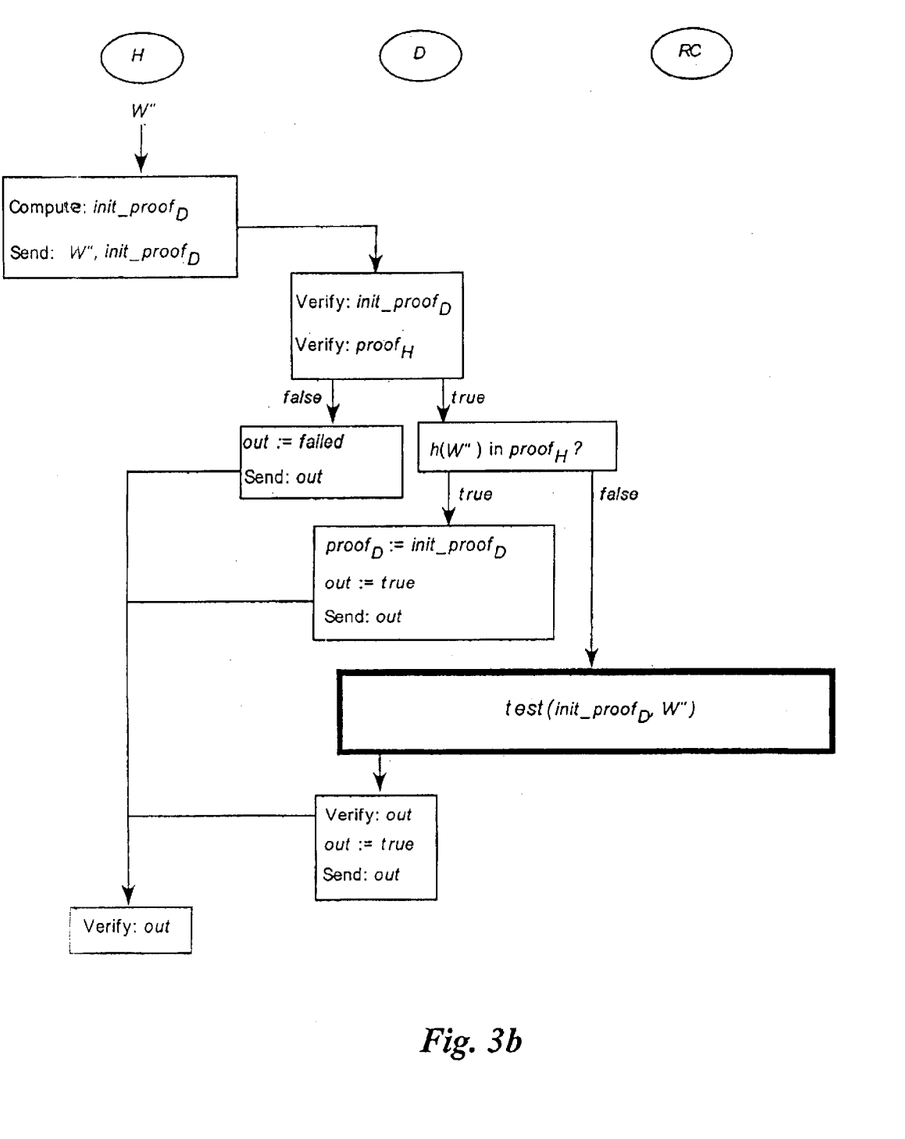

The generic protocol for the ownership proof is shown in FIGS. 3a and 3b.

Depending on the type of similarity relation, the subprotocol test for works that are not the registered original is implemented as follows:

1. $\rightarrow_{sim}$ is an equivalence relation:

According to Section A, ownership is then defined by formula (2). Hence it suffices to test if W$\rightarrow_{sim}$W", i.e., to carry out sim_test(W",·) without considering other registered works.

i. sim_test is public: In this case, D can perform test locally by executing sim_test(W", testinf$_W$). The result of test is the output of the similarity test and proof$_D$=init_proof$_D$.

This is the only case where test is computable locally and thus ownership proofs even for non-original works are possible with RC being offline.

ii. sim_test is private: In this case, D sends W" and init_proof$_D$ to RC, which computes result=sim_test(W", simrec$_W$). RC replies with proof$_D$=sign$_{RC}$(init_proof$_D$, confirm_time, result).

2. $\rightarrow_{sim}$ is not an equivalence relation: This complicates test because one has to consider the similarity to all works registered before W (see Section B.). Thus D has to contact RC by sending (W", init_proof$_D$), no matter if sim_test is private or public. To determine the rightful copyright holder, RC, in principle, iterates is ascending order of registration time over all registered works $W_i$ and performs sim_test(W, simrec$_{W_i}$). If the first work $W_i$ for which the similarity test returns true was registered by H, then result is true, otherwise false. RC also sends proof$_D$ as above.

Figure 3C:
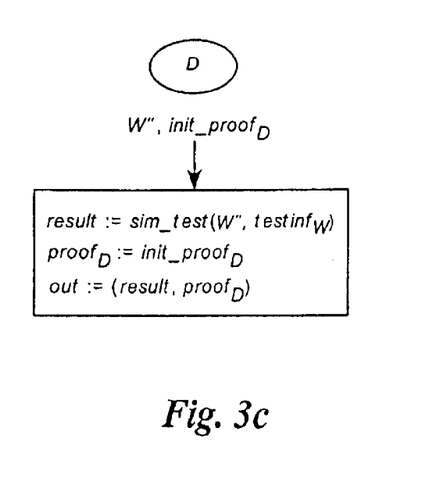
FIG. 3c a first test subprotocol test, when the similarity relation is an equivalent relation and the test public.
Figure 3D:
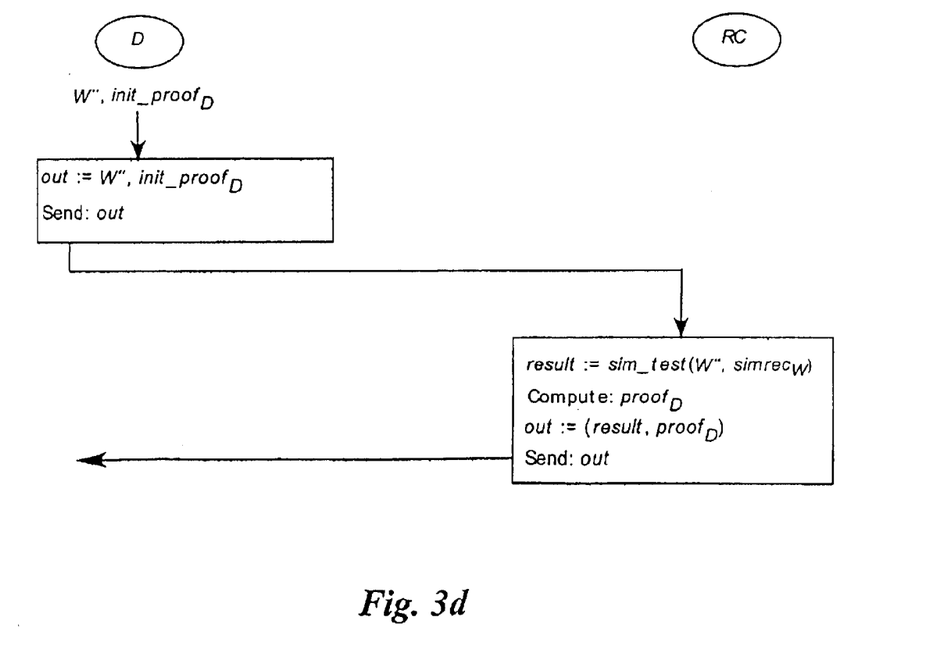
FIG. 3d a second test subprotocol test, when the similarity relation is an equivalent relation and the test private.
Figure 3E:
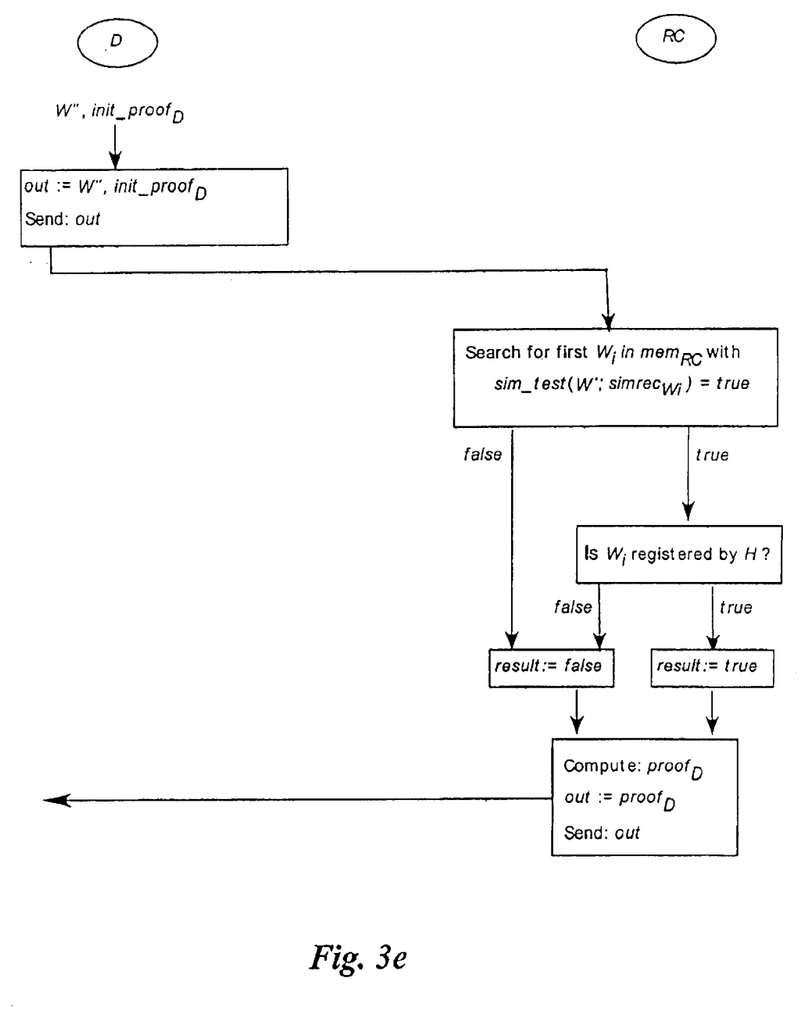
FIG. 3e a third test subprotocol test, when the similarity relation is not an equivalent relation.

Note that the ownership prove is possible with the registration center being offline, if the similarity relation is an equivalence relation and the corresponding similarity test is publicly executable. In this case, test can be executed locally by D and proof$_D$=init_proof. As mentioned above, the generic protocol for the proof of ownership prove(W") is shown in FIGS. 3a and 3b, the latter being a flow diagram. Three subprotocols are illustrated in FIGS. 3c to 3d.

Showing a proof: Using proof$_D$, D may run the show protocol with any third party D' to prove that he/she has successfully executed prove together with H for a work W". D starts by sending W" and proof$_D$, and D' verifies all components of init_proof$_D$, which is always a part of proof$_D$. Then there are two cases:

If proof$_D$ consists solely of init_proof$_D$, then D' first tests if h(W") is contained in init_proof$_D$ and, if yes, outputs true. Otherwise, such a proof is only allowed if similarity is an equivalence relation and the test is public. Then D' locally carries out sim_test(W", testinf$_W$). Otherwise proof$_D$ must also contain a signed confirmation of RC, and D' verifies that.

Figure 4A:
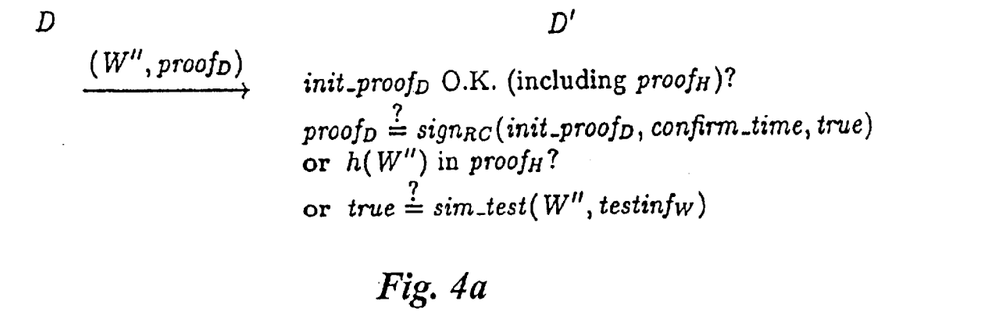
FIGS. 4a and 4b the show protocol show(W")
Figure 4B:
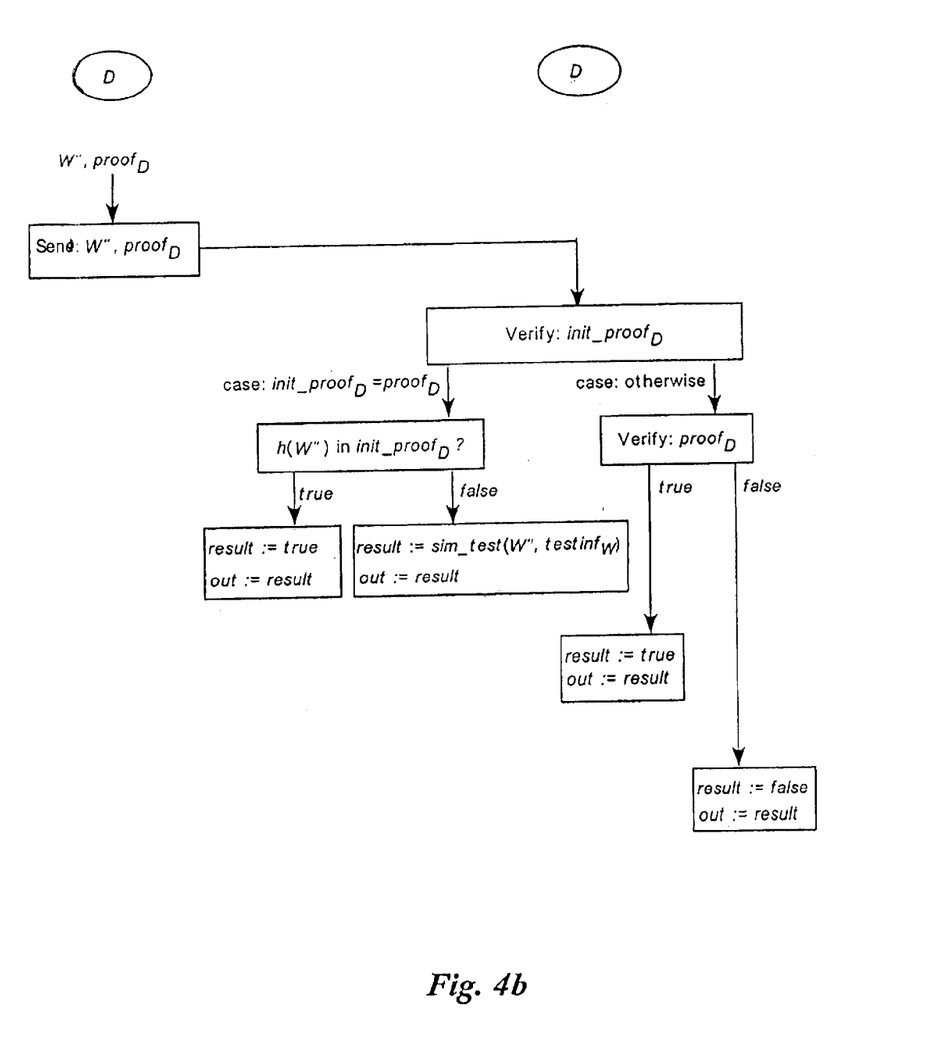

The protocol show is illustrated in FIGS. 4a and 4b, the latter again as flow diagram.

This finishes the description of the generic protocols. The above introduced generic protocols fulfill all requirements on an ownership proof scheme. Though this can be mathematically proven, such proof appears unnecessary here. The proof can be found in André Adelsbach, Birgit Pfitzmann, Ahmad-Reza Sadeghi: "Proving Ownership of Digital Content", published in the Lecture Notes in Computer Science 1768, Springer-Verlag, Berlin, 2000, pp. 117–133

D. Embodiments

Now some possible instantiations of the generic scheme for proof of ownership shall be shown and discussed. This means that concrete similarity tests sim_test and corresponding initialization algorithms sim_init are presented. Some possible approaches for defining and testing similarity between two works $W_1$ and $W_2$ are:

Exhaustive search: One defines explicit trivial transformations and performs an exhaustive search over all combinations for a certain depth, trying to derive $W_2$ from $W_1$. This test is very simple, but not computationally practical.

Characteristics: Similar digital works have similar main features. One could compute a kind of signature on these features, here called characteristic.

In the literature, such values are called signatures and used for authenticating digital content, see e.g., Ching-Yung Lin, Shih-Fu Chang: "Generating Robust Digital Signature for Image/Video Authentication", presented at Multimedia and Security Workshop at ACM Multimedia 98, Bristol, UK, September 1998, available at http://www.ctr.columbia.edu/~cylin/pub/acmmm98.ps. and database retrieval of multimedia data, see e.g., H. Wang, F. Guo, D. D. Feng, J. S. Jin: "A Signature for Content-Based Image Retrieval Using a Geometrical Transform", published in the Proceedings of the 6th ACM International Conference on Multimedia, ACM Press, New York 1998, pp. 229–234.

Please note that the term signature might be confused with cryptographic digital signatures.

Using an appropriate metric one can compare the characteristics of works instead of the works themselves. Works are called similar if their characteristics are close with respect to the defined metric.

Robust watermarks: Under certain prerequisites, robust watermarks can be applied to test the similarity between works. Assume a work $W_1$ is first watermarked and later the watermarked version is transformed into a work $W_2$. Then the similarity between $W_1$ and $W_2$ can be tested by detecting the embedded watermark. Note that watermarking are used as means for testing the similarity relation, not directly for ownership proofs.

Methods for content-based information retrieval: Content-based retrieval of multimedia data is an intensive research field. See, e.g., Greg Pass, Ramin Zabih, Justin Miller: "Comparing Images Using Color Coherence Vectors", published in the Proceedings of the 4th ACM Multimedia Conference, Boston, ACM Press, New York 1996, pp. 65–73

S. Ravela, R. Manmatha: "Image Retrieval by Appearance", published in the Proceedings of the 20th Annual International ACM SIGIR Conference on Research and Development in Information Retrieval, 1997, pp. 278–285.

Ruggero Milanese, Michel Cherbuliez, Thierry Pun: "Invariant Content-Based Image Retrieval Using the Fourier-Mellin Transform", International Conference on Advances in Pattern Recognition, Springer-Verlag, Berlin, 1999, pp. 73–82.

It typically yields rather coarse similarity relations that can be combined with others in this context.

Several such automatic similarity tests may be combined. Further, a hybrid sim_test including a human expert may produce the best results at reasonable costs. In registered? the similarity of one work with all registered works has to be tested. Here a hybrid similarity test may first use information-retrieval methods to efficiently preselect possibly similar works. Afterwards more exact similarity tests should be applied to the remaining works. Finally, a human expert may verify the similarity if the certainty of the automatic similarity tests is below a specified threshold.

D.I. Instantiations with Characteristics

Characteristics represent the main features of a work which have a short distance (with respect to a specific metric) for similar works.

One can obtain a similarity test which tests an equivalence relation and is public by using publicly computable robust characteristics, given by an algorithmchar, and defining works to be similar if they have the same characteristics. Robustness in this context simply means invariance against certain transformations of the underlying work.

For the purpose of textual data copyright protection characteristics have been proposed in the following publications:

Sergey Brin, James Davis, Hector Garcia-Molina: "Copy Detection Mechanisms for Digital Documents", published in ACM SIGMOD Record Vol. 24, No. 2, 1995, pp. 398–409.

Nevin Heintze: "Scalable Document Fingerprinting", published in the 2nd USENIX Workshop on Electronic Commerce, 1996, pp. 191–200.

For other types of works, one might use transformation-invariant aspects similar as in watermarking schemes, e.g., the most significant DCT coefficients of images are not much affected by compression.

An instantiation of the generic scheme may be implemented as follows:

$W'=W$, testinf$_W$=char(W), sim_test(W", testinf$_W$)=true ⇔ char(W')=testinf$_W$.

This also defines sim_init: on input W it outputs W'and testinf$_W$. Note that the test is indeed public and defines an equivalence relation. Hence this is a nice case where all ownership proofs can be performed with RC being offline. However, in practice such characteristics will only be invariant against certain kinds of transformations. Another problem is similar to one with publicly verifiable watermarks: one could continuously compute the characteristics and modify the work until the characteristics have another value. This attack is described in more detail by Ingemar J. Cox, Paul M. G. Linnartz: "Some General Methods for Tampering with Watermarks", published in the IEEE Journal on Selected Areas in Communications, Vol. 16, No. 4, May 1998, pp. 587–593.

To prevent this kind of attack, private characteristics may be used, but this also makes offline ownership proofs of non-original works impossible.

D.2. Instantiations with Watermarks

Here it is shown how to use a private, non-blind, and detectable watermarking scheme to implement a similarity test. Such watermarking schemes need a private key when inserting a watermark in a work. For watermark detection, one needs the private key, the original work, and the watermark. This class of watermarking schemes is used because they can provide the highest robustness. Any others are easier to apply.

The quality of the resulting similarity test is mainly influenced by the robustness of the watermarking scheme against malicious and non-malicious modifications of the work.

Let the watermarking scheme be given by two algorithms $\text{mark}(W, WM_W, sk_W^{WM})$ and $\text{detect}(W'', W, sk_W^{WM}, WM_W)$. Here W is the original work, $WM_W$ the watermark to be embedded, $sk_W^{WM}$ a secret watermarking key and W'' the work in which the watermark should be detected.

An instantiation of the generic scheme may be implemented as follows:

$$W' = mark(W, WM_W, sk_W^{WM})$$

$$simrec_W = (W, WM_W, sk_W^{WM})$$

$$sim\_test(W'', simrec_W) = detect(W'', W, sk_W^{WM}, WM_W).$$

The algorithm sim_init, on input W, chooses $WM_W$ and $sk_W^{WM}$ and computes W'and $simrec_W$ as above. To enable fast lookup of registration records, sim_init may also generate a unique record identifier $reg\_id_W$ which is output as $testinf_W$.

Such a similarity relation defined by watermarking is somehow unnatural because "really" similar works that have been created independently and even identical works are not considered similar. A work W''is only considered similar to a work W if it was generated by applying certain transformations to the watermarked version W''. However, this similarity test is suitable for ownership proofs on (maliciously) modified works and to prevent the registration of imitations.

An alternative that leads to a more natural similarity relation is to use an invertible watermarking scheme and let RC remove the watermark from W. The resulting fake original should be used instead of W as the reference work in the detection process, while W itself can now play the role of W'.

The invertibility of watermarking schemes is described by
Scott Craver, Nasir Memon, Boon-Lock Yeo, Minerva M. Yeung: "Resolving Rightful Ownerships with Invisible Watermarking Techniques: Limitations, Attacks, and Implications", published in the IEEE Journal on Selected Areas in Communications, Vol. 16, No. 4, May 1998, pp. 573–586.

Note that a cheating D who wants to remove a watermark from a work W'cannot misuse the two-party tests with RC as an oracle for trying out many variants of W', since RC only executes test if H certifies by $init\_proof_D$ that he/she really initiated an ownership proof with D for a certain W'', Alternatively, this adversary might try to use RC as an oracle by attempting to register many variants of W', until such a registration is successful. However, RC may limit the number of unsuccessful registrations of a user and even accuse him/her of plagiarism because the presence of the watermark is most likely not by accident.

E. Accountability of the Registration Center

So far, ownership proof systems were considered where the registration center is fully trusted by the other parties. Looking through the functions of RC in the generic protocols, a cheating RC could 1. refuse a registration, after obtaining the original work, claiming that a similar work has already been registered by another user H*,
2. issue an incorrect ownership certificate, which will not be accepted in ownership proofs,
3. collude with a cheater H* and issue him/her an ownership certificate for an already registered work, or
4. return a wrong test result in the prove protocol.

To make RC accountable, the registration protocol is extended such that RC has to commit to the content of its local memory $mem_{RC}$.

The problem is that in general RC needs the original work W to carry out the similarity tests, i.e., before it can promise that it will accept this work as new. However, once it has W, it could construct a similar work and claim that this is older. Hence we let RC fix the older works, but without showing them. This is what a commitment achieves. See, e.g.

Gilles Brassard, David Chaum, Claude Crépeau: "Minimum Disclosure Proofs of Knowledge", published in the Journal of Computer and System Sciences Vol. 37, 1988, pp. 156–189.

Concretely, one may use authentication trees are used for the content of $mem_{RC}$ and RC is required to bind itself to these trees by signing the corresponding roots.

Authentication trees were proposed by

Ralph C. Merkle: "Protocols for Public Key Cryptosystems", published in the Proceedings of the 1980 IEEE Symposion on Security and Privacy, Oakland, Calif., USA, pp. 122–134.

Figure 5A:
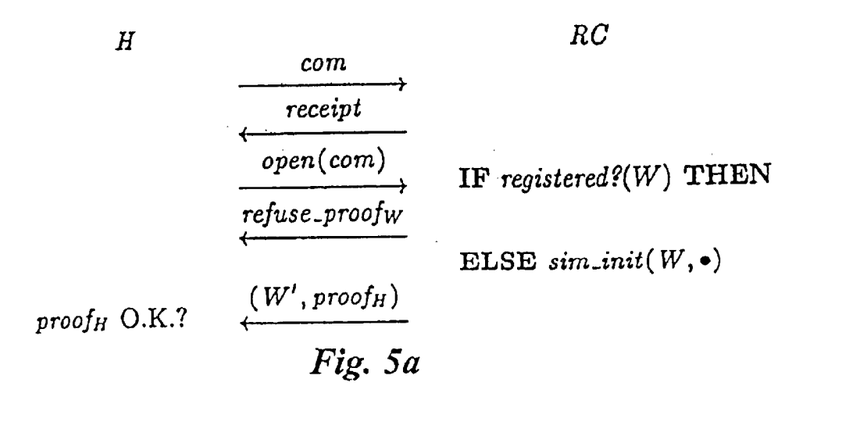
FIGS. 5a and 5b an extended register protocol.
Figure 5B:
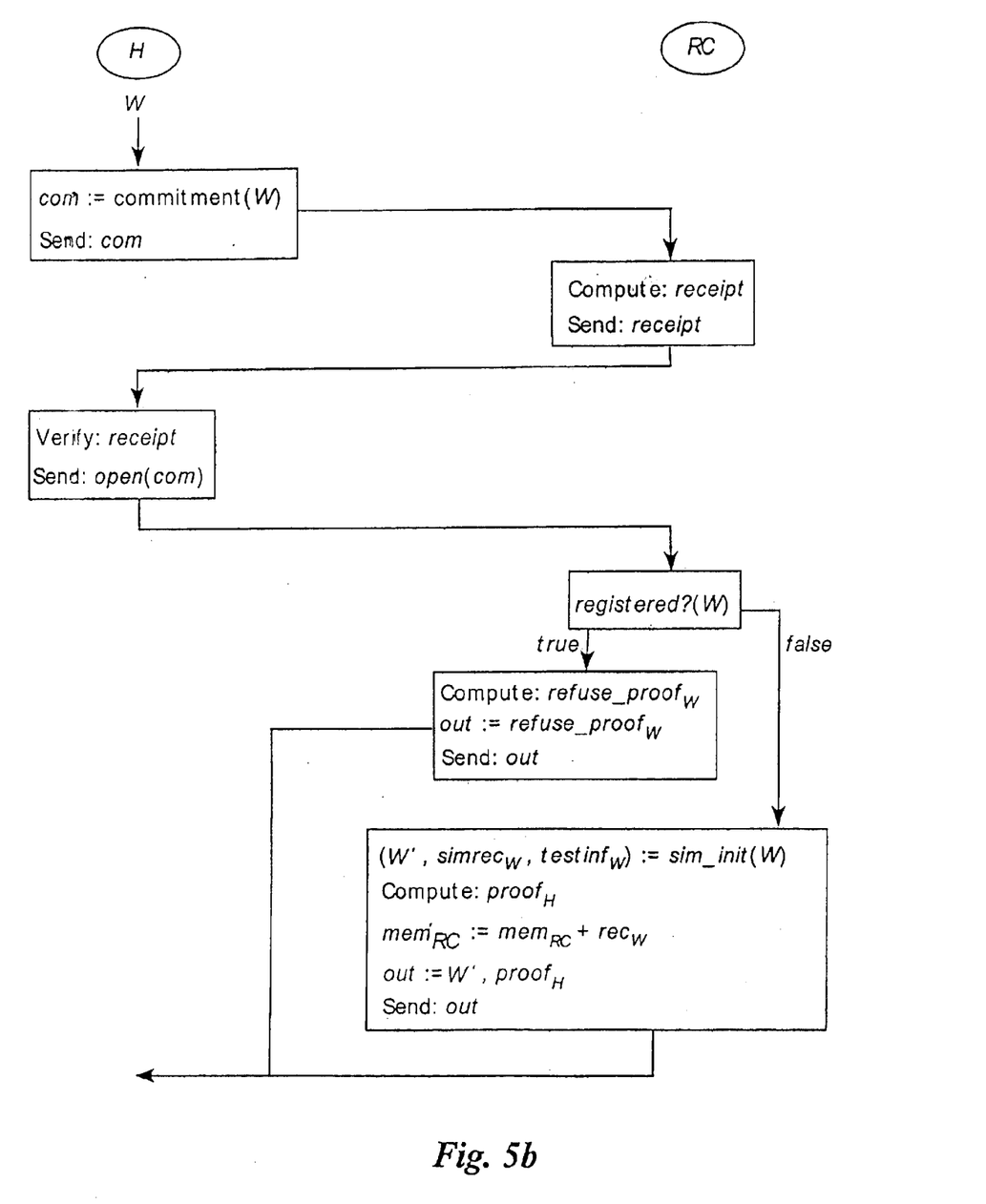

The extended registration protocol is shown in FIGS. 5a and 5b, the latter being a flow diagram, and will now be explained step by step. The signatures of H on its messages are omitted in the presentation.

Step 1: H initiates the protocol by sending a commitment com=commit(W) to the original work W to RC.

Step 2: RC replies with an acknowledgment receipt=$sign_{RC}(Id_H, com, root_{T_{pub}}, root_{T_{record}})$, where $root_{T_{pub}}$ and $root_{T_{record}}$ are the roots of two authentication trees $T_{pub}$ and $T_{record}$. The leaves of $T_{pub}$ are the public test information $testinf_{W_i}$ of all the works currently registered, and the leaves of $T_{record}$ the entire registration records $rec_{W_i}$ for these works. In order to later allow also H in person to convince himself that some $W_i$ is similar to his new work, one should include a possibly downgraded version of W' in $testinf_{W_i}$. One may include itself, but this is inadequate for situations where H may be an attacker who has licensed a low-quality copy W of and should not obtain the high-quality version. In this case, only reduced-quality or visibly watermarked versions should be used.

Step 3: H opens the commitment com, i.e., sends W and verification data.

Step 4: RC runs the local registered? algorithm.

a) If RC finds a similar registered work $W_i$ it has to prove this fact to H. For this, it sends H the proof string $refuse\_proof_W = sign_{RC}(testinf_W, authpath(i, root_{T_{pub}}), receipt)$. where $authpath(i, root_{T_{pub}})$ denotes the authentication path to the i-th leaf in the tree with this root.

b) Otherwise RC performs sim_init(W,•) and sends the work W'and the ownership certificate $proof_H = sign_{RC}(Id_H, h(W), h(W'), testinf_W, root'_{T_{record}}, reg\_time, reg\_text)$, to H. The new component root'$_{T_{record}}$ denotes the root of the record authentication tree augmented by the record rec$_W$ for the newly registered work.

Disputes: Next follows a discussion of how the additional measures in the extended registration protocol make RC accountable for the above-mentioned cheating possibilities.

1. By sending the signed root$_{T_{pub}}$ to H, RC commits to the public information about already registered works before H shows his/her original work W. To refuse the registration of W, RC has to find a similar work W$_i$ and prove to H that testinf$_{W_i}$ was contained in the tree T$_{pub}$ before RC obtained W by showing the authentication path from testinf$_{W_i}$ to root$_{T_{pub}}$.

If H does not accept refuse_proof$_W$, i.e., if he/she does not immediately see the similarity to the version of W'$_i$ included in testinf$_{W_i}$ and if the automatic similarity test is private, he/she can initiate a trial. There, a judge J requests the registration record rec$_{W_i}$ from RC and asks RC to authenticate it by showing authpath(i, root$_{T_{record}}$). This is why root$_{T_{record}}$ was included in the signature receipt. Then J can test whether W is really similar to W$_i$ by performing the same sim_test algorithm as RC performs in the normal case; all the necessary inputs are contained in rec$_{W_i}$.

2. If H finds out that RC has issued a wrong ownership certificate to him/her, he/she may start a trial in which the judge verifies the certificate by requesting the authentic registration record rec$_W$ from RC.

3. If the rightful copyright holder H finds out that there has been a fake ownership proof with a second certificate, he/she can initiate a trial. In the trial, the judge requests RC to show the authenticated records corresponding to these two certificates and verifies whether RC has performed the algorithm registered? correctly.

4. RC may cheat in the 2-party test protocol, by returning a wrong result to D. If H suspects RC of cheating in the RC protocol, he/she can initiate a trial in which RC has to show all registration records rec$_{W_i}$ up to rec$_W$ to J and authenticate them by authpath(i, root'$_{T_{record}}$). This enables J to execute test himself and verify the result given by RC. To also enable D to hold RC accountable for cheating in test, RS additionally has to apply public times-tamping techniques to root$_{T_{record}}$. One may use the public timestamping techniques described by Stuart Haber, W. Scott Stornetta: "How to time-stamp a digital document", published in the Journal of Cryptology, Vol. 3, No. 2, 1991, pp. 99–111.

Note that even in this scheme, a cheating registration center may violate the requirements of an ownership proof system. However, these protocols then end with a trial and in the worst case with an ownership dispute, where any honest third party J will decide in favor of the rightful copyright holder.

Concluding, this invention presents the first general model for proof of ownership of digital works. It shows the advantages of proving the ownership over resolving the ownership in disputes, which aspect has not been addressed before. A further significant element is that the ownership of digital works refers not only to the original work, but also to works similar to the original work.

The requirements on ownership proof schemes have been defined, as well as generic protocols for them, based on arbitrary similarity tests of digital works for the case where the registration center is trusted.

The case where the trust in the registration center is reduced has also been considered and measures for making a cheating registration center accountable were introduced.

Further, concrete instantiations of the generic scheme by using characteristics and watermarks have been shown.

While it has been shown what are at present considered the preferred embodiments of the invention, it will be obvious to those skilled in the art that various changes, modifications, and/or replacements can be made therein without departing from the spirit and scope of the invention as defined in the following claims.

What is claimed is:

1. A method for proving ownership of a digital work W, involving a copyright owner H of said work, a registration center RC, and at least one third party D, comprising the following protocols:

automatically plementing an ownership registration protocol for identifying said owner H, and his/her work W to be registered to said registration center RC;

wherein said ownership registration protocol is a two-party protocol between the owner H and said registration center RC concerning his/her original work W$_i$ to be registered, in said ownership registration protocol, said owner H then obtaining a proof of ownership certificate, by way of a proof string proof$_H$ identifying said owner H and said work W and, potentially, any other work W" derived from said work W; and said registration center RC performing a similarity test to prevent multiple registrations of similar works and transmitting a certificate to owner H of a form:

proof$_H$=sign$_{RC}$(Id$_H$, h(W), h(W'), testinf$_W$, reg_time, reg_text), wherein Id$_W$, identifies owner H, h(W), h(W') denote hash values of a collision free hash function h, reg_time denotes a registration time, and reg_text denotes a textual description of the registration;

implementing a proof of ownership protocol which enables said owner H to prove his/her ownership in said work W, and in any other work derived from said work, W to said third party D, and implementing a show protocol which enables said third party D to demonstrate his/her legitimate rights in said work W, that he/she has obtained a proof of ownership from a rightful owner of the work W.

2. The method according to claim 1 further comprising implementing an initialization protocol for setting up the system, comprising using cryptographic key generation for the parties involved.

3. The method according to claim 2 wherein said initialization protocol utilizes a cryptographic key exchange by which each party involved obtains a key pair and an authentic public key of each other party.

4. The method according to claim 1 wherein the method of implementing said ownership registration includes:

modifying the original work W resulting in a modified work W', in particular by introducing imperceptible modifications like watermarks or fingerprints, transferring said modified work W" to the owner H for distribution.

5. The method according to claim 4 wherein said registration protocol has the form

6. The method according to claim 4 wherein said registration protocol is extended and has the form

7. The method according to claim 1, wherein said proof of ownership protocol is a two party protocol between owner H and third party D, and the registration center RC, wherein
said owner H transmitting a possibly modified version of the work W, denoted W" with the proof string or certificate $proof_H$ and a signed statement to said third party D,
said third party D performing a local similarity test $sim\_test(W", testingf_W)$ whose putput to D is a proof string $proof_D$ particularly consisting of $init\_proof_D$.

8. The method according to claim 1, wherein said proof of ownership protocol is a three-party protocol among said owner H, said third party D, and said registration center RC, wherein
said owner H transmitting a possibly modified work W" for which he/she wants to prove his/her ownership with the certificate $proof_H$ and a signed statement to said third party D,
said third party D requesting the confirmation of said registration center RC on the validity of claimed ownership and
said registration center RC testing in a subprotocol whether the first registered work, to which W" is similar, was registered by H.

9. The method according to claim 8 wherein said proof of ownership protocol used in said method has the form

10. The method according to claim 1, wherein
said show protocol used in said method is a two-party protocol between on third party D having successfully executed the proof of ownership process for a work W" and another third party D' to which said one party D intends to demonstrate its rights in work W"'.

11. The method according to claim 10, wherein said show protocol used in said method includes
said other third party D' sending the test result $proof_D$ and a modified work W' to the other third party D',
said other third party D' checking the components of $proof_D$, and
said other third party D' accepting the demonstration is said check is positive.

12. The method according to claim 1 wherein said proof of ownership protocol used in said method has the form

13. A computerized system for proving copyright ownership of a digital work W, of an owner H, including a registration center RC, implemented by a group of protocols, said system comprising:
means for executing an initializing protocol for setting up said system, including cryptographic key generation for parties involved;
means for executing a registration protocol for identifying said owner H, and his/her work W to be registered to said registration center RC;
means for executing a proof of ownership protocol which enables said owner H to prove his/her ownership in said work W, and in any other work derived from said work, W to a third party D,
means for executing a show protocol which enables said third party D to demonstrate that he/she has legitimate rights in said work W wherein:
said means for executing said registration protocol further:
controls said registration center RC to perform a similarity test to prevent multiple registrations of similar works and
transmit to owner H a certificate of a form:
$proof_H = sign_{RC}(Id_H, h(W), h(W'), testinf_W, reg\_time, reg\_text)$, wherein $Id_H$ identifies owner H, $h(W), h(W')$ denote hash values of a collision free hash function h, $reg\_time$ denotes a registration time, and $reg\_text$ denotes a textual description of the registration.

14. The computerized system of claim 13, wherein said means for executing the initializing protocol generates cryptographic keys for the parties involved and provides a cryptographic key exchange by which each party obtains a key pair, including the authentic public key of each other party.

15. The computerized system of claim 13, wherein said means for executing the registration protocol comprises means for producing a proof of ownership certificate for the owner H, including a proof string $proof_H$ identifying said owner and said work W and, any other work W" derived from said work W, means for modifying said original work W resulting in a modified work W' by introducing imperceptible modifications, and means for transferring said modified work W' to owner H for distribution.

16. The computerized system of claim 13, wherein said means for executing a proof of ownership protocol performs either a two-party protocol between said owner H and said third party D, whereby said owner H transmits a modified version W" of the work W with a proof string or certificate $proof_H$ and a signed statement to said third party D, and said third party D performs a similarity test sim_test(W", $testinf_W$) whose output to D is a proof sting $proof_D$ consisting of $init\_proof_H$, or a three-party protocol between among He said owner H, said third party D, and said registration center RC, whereby said owner H transmits said modified work W" with the certificate $proof_H$ and a signed statement to said third party D, the latter requests a confirmation from said registration center RC on the validity of the claimed ownership and said registration center RC tests in a subprotocol whether the first registered work, to which W" is similar, was registered by H.

17. The computerized system of claim 13 wherein the means for executing said show protocol has means for allowing a first party D to send said test result $proof_D$ and a modified work W" to a second party D', means for allowing said second party D' to check the components of $proof_D$ and to accept said first party's claim of rights in work W' is legitimate.

* * * * *